United States Patent
Pons

[15] 3,683,025
[45] Aug. 8, 1972

[54] HYDROGENATION OF NITROBENZENES

[72] Inventor: Henry W. Pons, 1 Pine Tree Road, Lock Haven, Pa. 17745

[22] Filed: May 6, 1969

[21] Appl. No.: 822,324

[52] U.S. Cl. .................260/575, 252/446, 252/447, 252/460, 252/472, 260/558 R, 260/562 R, 260/580
[51] Int. Cl. .............................................C07c 85/10
[58] Field of Search...................260/580, 575, 562 R

[56] References Cited

UNITED STATES PATENTS

| | | | |
|---|---|---|---|
| 3,041,377 | 6/1962 | Harast | 260/580 |
| 3,093,685 | 6/1963 | Hort et al. | 260/580 |
| 3,132,180 | 5/1964 | Hort et al. | 260/580 |
| 3,136,818 | 6/1964 | Sperber et al. | 260/580 |
| 3,148,217 | 9/1964 | Freyermuth et al. | 260/580 |
| 3,154,584 | 10/1964 | Gardner et al. | 260/580 |
| 3,293,295 | 12/1966 | Swakon et al. | 260/580 X |
| 3,328,465 | 6/1967 | Spiegler | 260/580 |

*Primary Examiner*—Robert V. Hines
*Attorney*—James E. Armstrong, III and Olin E. Williams

[57] ABSTRACT

Nitrobenzenes, particularly nitrobenzenes containing active chlorine atoms, are hydrogenated at low pressures and temperatures in the presence of substantial amounts of water using a supported nickel catalyst promoted by zirconium.

7 Claims, No Drawings

HYDROGENATION OF NITROBENZENES

BACKGROUND OF THE INVENTION

The extensive work on reduction of aromatic nitro compounds to the corresponding aromatic amines is well described by Freyermuth et al. in U.S. Pat. No. 3,148,217. Freyermuth et al. report that in the reduction of aromatic nitro compounds, particularly those containing active halogens, one of the major difficulties has been inactivation of the catalyst caused by by-products formed during reduction, particularly water. Another frequently encountered problem in the hydrogenation of chloronitrobenzenes such as o-chloronitrobenzene, is dehydrohalogenation; the rate of which depends upon the activation of the chlorine, the amount of catalyst, the solvent, the activity of the catalyst, and the support. Freyermuth et al. found that chloronitrobenzenes could be reduced with a nickel catalyst, such as nickel on alumina or Raney nickel, by carrying out the reaction in a highly stirred reaction zone, whereby the water formed during the reaction remained well dispersed throughout the liquid in the reaction zone as a separate and distinct liquid phase.

I have discovered that, surprisingly, nitrobenzenes, especially the halonitrobenzenes, can be reduced conveniently in high yield and purity at low pressures and temperatures in the presence of nickel catalyst promoted by zirconium. Contrary to the established practice in the prior art, my new reaction is effective only if water in considerable amount on a mole basis is added to the reaction mixture prior to carrying out the reduction.

SUMMARY OF THE INVENTION

In accordance with the invention, nitrobenzenes are reduced by first adding to the reaction mixture from 1 to 4 moles of water per mole of nitrobenzene and contacting the resulting mixture with hydrogen under positive pressure at a temperature ranging from room temperature to 75° C. in the presence of a catalytic amount of a nickel catalyst. The nickel catalyst used in the process is supported on an inert carrier and consists essentially of 10–70 percent by weight nickel, based on the weight of the catalyst, and 0.5–5 percent by weight of zirconium.

DETAILED DESCRIPTION

The starting materials for use in the invention are any of the nitrobenzenes, including o-, m-, and p-nitroaniline; m-, and p-nitroacetanilide; and m-nitrobenzanilide, o-, m-, and p-nitroanisoles, o-, m-, and p-nitrophenetoles, o-, m-, and p-nitrotoluenes; 3,4-dinitrobenzanilide. The process is particularly useful for the reduction of nitrobenzenes containing an active halogen, since the hydrogenation can be accomplished to provide a high conversion to the desired haloaniline without measurable dehydrohalogenation. In the halonitrobenzenes, the halogen atom is active if it is present in a position ortho- or para- to the nitro group, Halonitrobenzenes in which there are more than one active halogens in the molecule or inactive halogens in the molecule are efficiently reduced using my process. Any halogen atom, including fluorine, chlorine, bromine and iodine, may be present in the molecule. Starting materials of particular commercial importance include 2-chloronitrobenzene; 3-chloronitrobenzene; 4-chloronitrobenzene; 1,4-dichloro-2-nitrobenzene; 3,4-dichloronitrobenzene; 2,4-dichloronitrobenzene. Other effectively useful starting materials include 4-chloro-3-nitrobenzotrifluoride; 2,3,4-trichloronitrobenzene, 4-iodonitrobenzene; 2,6-dibromonitrobenzene; 6-fluoro-2-nitrotoluene; 3,4-dibromonitrobenzene and the like.

In view of prior art experience, one of the surprising features of my new process is the presence of large amounts of water during the hydrogenation. Prior to the reaction from 1–4 moles of water, based on the amount of nitrobenzene is added to the reaction mixture. The addition of water is a surprising departure from prior art techniques in which water are either eliminated from the reaction mixture or tolerated only to the extent that the water formed during the reaction was maintained as a separate and distinct liquid phase by a high-speed stirrer. According to my process, if no water is added to the reaction mixture, no measurable hydrogenation occurs during the preferred operating conditions with the particular catalyst employed. At least 1 mole of water should be present in order to accomplish effective reduction. The presence of more than 4 moles of water causes deamination; e.g. at a water concentration of 6–7 moles deamination occurs to the extent of about 10 percent.

In addition to the water, an organic solvent that is inert to the products and to the reactants may be added to the reaction mixture. Suitable solvents include the aromatic hydrocarbons, such as benzene, toluene, and xylene and ethers such as dioxane. It is convenient and therefore, usually preferable to hydrogenate directly without adding additional solvent.

The nickel catalyst suitable for the invention is metallic (reduced) nickel supported on an inert carrier, such as kieselguhr, Fuller's earth, kaolin, activated carbon, silica gel, alumina, and silica alumina. Such catalyst contain about 10–70 percent nickel based on the weight of the composition. The catalyst also contains from 0.5–5 percent by weight of metallic (reduced) zirconium.

The catalyst is used in amounts of 0.5–5 percent by weight, based on the weight of the nitrocompound, preferably in amounts of 1–3 percent by weight. Lesser amounts of catalyst are less effective and larger amounts of catalyst; e.g., up to 10 percent by weight, causes considerable dehydrohalogenation if the starting material is nitrobenzene containing an active halogen atom.

One of the outstanding features of my new process is the fact that hydrogenation can be carried out under mild conditions of temperature and pressure. Temperatures between room temperature and 125° C. are conveniently used, the preferred temperature range being 30°–65 C. Any pressure from a slight positive pressure (above atmospheric pressure) up to 300–400 psig. can be used successfully. Naturally, because of the cost of high pressure equipment and high processing costs because of hydrogen consumption, it is desirable to use the lowest effective pressure, a preferred range being 45–75 psig. When the higher pressures of up to 300–400 psig. are used, there is a reduction in reaction time and usually a slight increase in product purity.

During the hydrogenation, the reaction mixture is subjected to mild agitation to maintain good contact between the reactants. High speed stirring in a stirred autoclave is not necessary, and is, therefore, not critical to the success of the hydrogenation. Hydrogenation is complete in about 5–20 hours, depending primarily on the hydrogenation pressure, although to some extent on the choice of reactant and the choice of temperature. Using the process of the invention, the yields of crude products are consistently in excess of 96 percent and the purity of the product amine is ordinarily 96–99 percent.

My invention is further illustrated by the following examples:

EXAMPLE I

A 1-liter Parr autoclave, equipped with a 316 stainless steel stirrer was charged with 315 g. o-chloronitrobenzene (2.0 moles) 9.45 g. Girdler Ni catalyst G-69 (50% Ni, 2% Zr supported on kieselguhr) and 67 ml. water. The mixture was hydrogenated for 17 hours at 31°–46° C., 65 psig. and 888 rpm. stirrer speed until hydrogen absorption ceased. The organic phase was separated from the aqueous phase and analyzed.

Yield: 246 g. o-chloroaniline, crude
(0.19 mole, 96.8% of theory)
Analysis: (VPC) 97.7% o-chloroaniline
1.9% aniline
0.18% chlorobenzene
0.06% o-chloronitrobenzene

EXAMPLE II

The Parr autoclave described in Example I was charged with 315 g. m-chloronitrobenzene (2.0 moles) 9.45 g. Girdler Ni-catalyst G-69, 67 ml. water. The mixture was hydrogenated at 34°–40° C. and 300–400 psig. for 5 hours at 888 rpm. stirrer speed. The resulting 3-chloroaniline was separated and analyzed.

Yield: 249.4 g. 3-chloroaniline crude
(1.96 mole) or 98.0% of theory)
Analysis: (VPC) 96.9% m-chloroaniline
1.8% aniline
1.21% o-chloroaniline

EXAMPLE III

The 1-liter Parr autoclave described in Example I was charged with 315 g. p-chloronitrobenzene (2.0 mole) 9.45 g. Girdler Ni-catalyst G-69, 250 ml. benzene, 150 ml. water. The mixture was hydrogenated at 39°–43° C., and 58–71 psig. for 5 ½ hours at 888 rpm stirrer speed. The water was separated and the benzene flash distilled.

Yield: 251 g. 4-chloroaniline crude
(1.97 mole) 98.6% theory
Analysis: (VPC) 98.8% 4-chloroaniline
0.21% aniline
0.76% chlorobenzene

EXAMPLE IV

To the 1-liter Parr autoclave described in Example I, was charged 192 g. 1,4-dichloro-2-nitrobenzene (1.0 mole) 5.76 g. Girdler Ni-catalyst G-69, 150 ml. benzene and 60 ml. water. The mixture was hydrogenated at 43°–46° C. and 300–400 psig. for 19 hours at 888 rpm stirrer speed. The product was worked up as described in Example III and analyzed:

Yield: 160.1 g. 2,5-dichloraniline, crude
(0.99 mole) or (99% theory)
Analysis: (VPC) 94.8% dichloroaniline
1.06% chloroaniline
3.88% aniline

EXAMPLE V

The procedure of Example I was repeated with the exception that no water was added to the reaction mixture prior to hydrogenation. The reaction was discontinued after 2 ½ hours. No measurable absorption of hydrogen had taken place.

EXAMPLE VI-XV

A series of experiments was run in the 1-liter Parr Autoclave (315 stainless steel) using the procedure of the foregoing examples for the reduction of o-nitrochlorobenzene, varying conditions of catalyst, water concentration, reaction temperature, pressure and time. The following results shown in Table I were obtained:

TABLE I

| Experiment Number | Catalyst percent based on o-nitro-chlorobenzene | H₂O Ml. | H₂O Moles | o-Nitro-chlorobenzene, moles | Temp., °C. | Pressure, p.s.i. | Reaction time, hours | Yield percent crude | o-Chloro-aniline | Aniline | Chloro-benzene | o-Nitro-chlorobenzene |
|---|---|---|---|---|---|---|---|---|---|---|---|---|
| VI | 1 | 100 | 3.6 M. sodium acetate. | 3.0 | 45–50 | 40–50 | 29.5 | 96.3 | 98.2 | 0.88 | | |
| VII | 3 | 67 | 3.72 | 2.0 | 35–40 | 55–60 | 16.8 | 96.8 | 97.7 | 1.90 | 0.18 | 0.13 |
| VIII | 5 | 100 | 3.6 M. sodium acetate. | 3.0 | 45–47 | 45–51 | 12.3 | 98.1 | 98.4 | 1.44 | | |
| IX | 10 | 82 | 4.55 | 2.5 | 30–35 | 50–65 | 16.5 | 89.1 | 93.0 | 6.80 | 0.05 | 0.07 |
| X | 3 | 67 | 3.6 M. sodium acetate. | 2.0 | 69–71 | 55–60 | 13.0 | 96.3 | 96.5 | 2.56 | 0.32 | 0.61 |
| XI | 3 | None | | 2.0 | 30–55 | 50 | | | | | | |
| XII | 3 | 230 | | 2.0 | 33–39 | 56–65 | 11.3 | 96.6 | 88.2 | 0.62 | 10.9 | 0.21 |
| XIII | 3 | 67 | | 2.0 | 29–35 | 150–250 | 9.5 | 97.2 | 98.8 | 0.99 | 0.08 | 0.13 |
| XIV | 3 | 67 | | 2.0 | 30–55 | 300–400 | 5.3 | 96.7 | 98.0 | 1.50 | 0.07 | 0.40 |
| XV | 3 | 67 | | 2.0 | 39–41 | 300 | 6.0 | 98.0 | 97.7 | 2.13 | | |

Example XIX shows the detrimental effect of having too high a concentration of catalysts. Extensive dehydrohalogenation occurred as is evidenced by the high yield of aniline formed. With regards to the dehydrohalogenation, Example X shows the detrimental effect of increased temperature and Examples XIV and XV show the effect of increased pressure. Example XII shows that an excess of water leads to extensive deamination as is evidenced by the high percentage of chlorobenzene formed.

EXAMPLE XVI

A 1-liter Parr autoclave was equipped with a stainless steel stirrer and was charged with 291 g. 3,4-dichloronitrobenzene (1.52 moles), 8.7 g. Girdler Ni-catalyst, G-69 and 67 ml. water. The mixture was hydrogenated for 7.5 hours at 50°–60° C., 250 psig and 888 rpm stirrer speed until hydrogen absorption ceased. The organic phase was separated and a crude yield of 94 percent 3,4-dichloroaniline was recovered.

EXAMPLE XVII

The Parr autoclave described in Example I was charged with 274 g. p-nitrotoluene, 8.0 g. Girdler Ni-catalyst, G-69, and 250 ml. water. The mixture was hydrogenated at 55°–60° C. and 200 psig. for 4 hours and 10 minutes at 888 rpm. stirrer speed. The organic phase was separated, and paratoludine was recovered in 95 percent crude yield.

EXAMPLE XVIII

The Parr autoclave described in Example XVI was charged with 274 g. of o-nitrotoluene (2.0 moles) 8 g. Girdler Ni-catalyst, G-69 and 250 ml. water. The mixture was hydrogenated at 45°–55° C. and 200–250 psig. for 3 hours and 28 minutes at 888 rpm. stirrer speed. The organic phase was separated and o-toludine was recovered in 96.7 percent crude yield.

EXAMPLE XIX

The Parr autoclave as described in Example VI was charged with 76.5 g. of o-nitroanisole (5.0 moles) 4g. Girdler Ni-catalyst G-69 and 300 ml. water. The mixture was hydrogenated at 49°–51° C. and 150–200 psig. for 2 hours and 10 minutes at 888 rpm. stirrer speed. The organic phase was separated and crude anisidene was recovered.

EXAMPLE XX

A 1-liter Parr shaker bottle (general agitation to promote contact between reactants) was charged with 41.4 g. of 4-nitroaniline (0.4 moles) 150 ml. water and 0.41 g. Girlder Ni-catalyst G-69. The mixture was hydrogenated at about 60° C. and 30–31 psig. for 22.75 hours. The organic phase was separated and phenylenediamine was recovered in 91.4 percent crude yield.

EXAMPLE XXI

A 1-liter Parr shaker of Example XX was charged with 18 g. meta-nitroacetanilide (0.1 mole) 100 ml. water and 0.18 g. Girdler Ni-catalyst G-69. The mixture was hydrogenated at 60°–65° C. at 47–49 psig. for 7–8 hours. The organic phase was separated and 3-aminoacetanilide was recovered in 98.5 percent crude yield.

What is claimed is:

1. In a method of producing aromatic amine by the reduction of a nitrobenzene with hydrogen under positive pressure at a temperature from room temperature to 125° C in the presence of a catalytic amount of a nickel catalyst supported on an inert carrier, said catalyst consisting essentially of 10–70 percent by weight nickel, the improvement comprising
   a. reducing said nitrobenzene in the form of a nitrobenzene: water mixture containing from 1 to 4 moles water per mole of said nitrobenzene, said mixture being prepared prior to the reduction process and the contents of which being maintained in intimate contact during said reduction; and
   b. incorporating 0.5–5 percent zirconium in said catalyst.

2. In the method of claim 1, the improvement wherein said nitrobenzene is a halonitrobenzene.

3. In the method of claim 2, the improvement wherein said nitrobenzene is a chloronitrobenzene.

4. In the method of claim 1, the improvement wherein said nitrobenzene is a lower alkoxy nitrobenzene.

5. In the method of claim 1, the improvement wherein nitrobenzene is a lower alkyl nitrobenzene.

6. In the method of claim 1, the improvement wherein the catalyst consists essentially of 50 percent by weight Ni and 2% Zr supported on Kieselguhr and is present in an amount of 1–3 percent by weight of the nitrobenzene.

7. In the method of claim 1, the improvement wherein said nitrobenzene is nitroaniline.

* * * * *